United States Patent [19]

Kygar

[11] Patent Number: 4,598,483

[45] Date of Patent: Jul. 8, 1986

[54] APPARATUS AND METHOD FOR VERIFICATION OF JACKET FOR FLOPPY DISK

[76] Inventor: Quincy D. Kygar, 19683 Charters Ave., Saratoga, Calif. 95070

[21] Appl. No.: 752,417

[22] Filed: Jul. 5, 1985

[51] Int. Cl.⁴ .............................................. G01B 5/02
[52] U.S. Cl. ...................................... 33/548; 33/552; 33/168 R; 33/533
[58] Field of Search ................ 33/552, 557, 560, 546, 33/548, 533, 168 R

[56] References Cited

U.S. PATENT DOCUMENTS

| | | | |
|---|---|---|---|
| 3,102,344 | 9/1963 | Herman | 33/548 |
| 3,594,909 | 7/1971 | Schultz | 33/552 |
| 4,326,336 | 4/1982 | Hreha | 33/548 |

*Primary Examiner*—Willis Little
*Attorney, Agent, or Firm*—Townsend and Townsend

[57] ABSTRACT

Apparatus and a method for verifying that the various dimensions and shape of the jacket for a floppy disk are correct and within predetermined tolerance ranges. The apparatus of the present invention includes instruments for determining the warpage of the jacket, the parallelism between a pair of primary fold lines of the jacket, the squareness between the first fold line of the jacket and each of the primary fold lines of the jacket, the distance from the central line of the jacket to each of the primary fold lines thereof, the width and depth of a write-enable slot and the distance of the slot to the first fold line of the jacket, the squareness of all four sides of the jacket with reference to each other, and the thickness of the regions of the primary and final fold lines. The method of the present invention comprises a series of steps including the steps of determining the warpage of the jacket, parallelism between the first fold line and each of the primary fold lines, the squareness of each primary fold line with reference to the first fold line, the distance between the central line of the jacket and each of the primary fold lines, the width and depth of the write-enable slot and its distance to the first fold line, the squareness of all four sides relative to each other, and the thickness of the regions of the primary and final fold line areas. Warpage is determined by dropping the jacket through a generally vertical slot, and the other determined with dial gauges or other similar devices.

18 Claims, 11 Drawing Figures

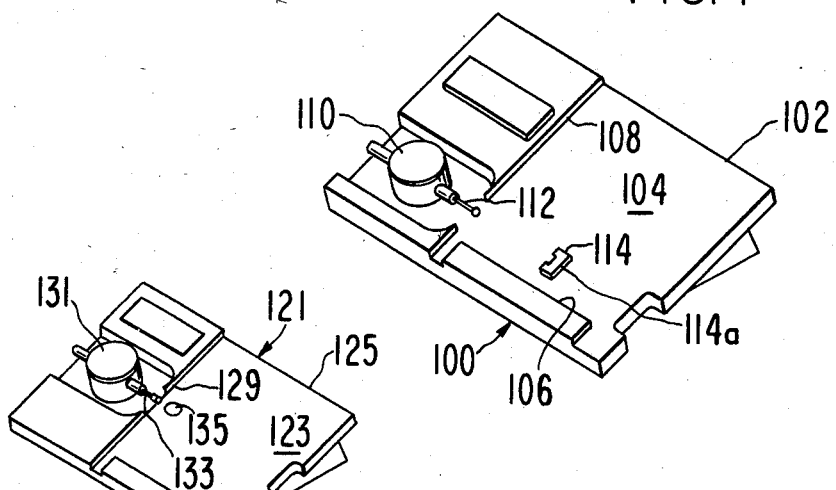
FIG. 4
FIG. 4A
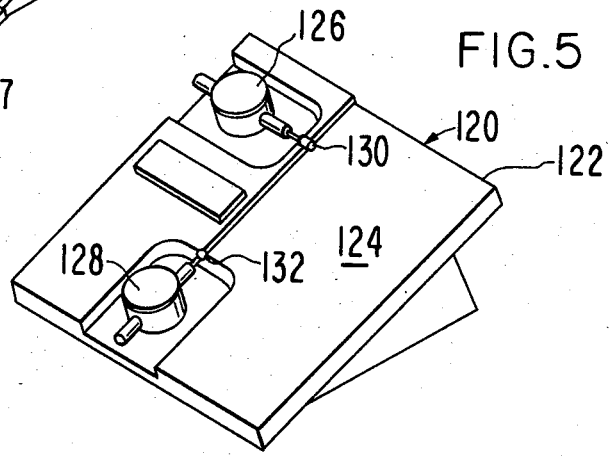
FIG. 5
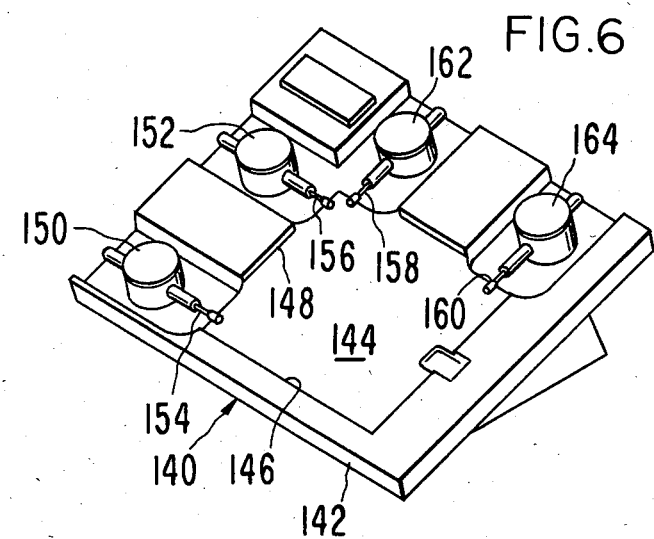
FIG. 6

APPARATUS AND METHOD FOR VERIFICATION OF JACKET FOR FLOPPY DISK

This invention relates to improvements in the calibration of equipment for making jackets for floppy disks and, more particularly, to apparatus and a method for determining the dimensional characteristics of such a jacket.

BACKGROUND OF THE INVENTION

In the making of jackets for floppy disks, it is important that the jackets have the proper dimensions and shape to fit properly in disk drives of conventional construction. Such disk drives will not accept a floppy disk if the jacket of the floppy disk is not within predetermined tolerance ranges as to warpage, thickness, squareness, and parallelism with reference to the edges of the jacket. Thus, it is mandatory that the jackets be of the proper size and shape and to be able to conform to a desired configuration within tight tolerances. To assure that jackets meet these requirements, a need has existed for an improved apparatus and a method for determining the dimensional characteristic of the jackets of floppy disks so that such jackets can be readily used with conventional disk drives. The present invention satisfies this need as hereinafter described.

SUMMARY OF THE INVENTION

The present invention provides a group of instruments which are adapted to be placed adjacent to each other to quickly determine certain dimensional features of the jacket of a floppy disk. Thus, knowledge of such features can be used to establish whether or not the jacket falls within tolerance ranges which are deemed acceptable in order for the jacket to be used with conventional disk drive equipment. Thus, the jacket, whose features are found to be acceptable, can be used for containing a floppy disk. Otherwise, the jacket must be discarded because it could later cause operational problems which could be damaging to the equipment with which the jacket is intended to be used.

The apparatus of the present invention is adapted to measure a number of features, including the warpage of a jacket, the parallelism between a pair of primary fold lines at the sides of the jacket, the squareness between each primary fold line and the central or first fold line of the jacket, the distance from each primary fold line to the center line of the jacket, the width and depth of a write-enable slot at one side edge of the jacket and the distance from this write-enable slot to the central or first fold line of the jacket, the squareness of all four sides of the jacket relative to each other and the thickness of the jacket in the primary fold and final fold line areas thereof. All of the aforesaid dimensional features of the present invention can be quickly and easily determined with the use of a minimum amount of space and equipment, at minimum cost and with a high degree of accuracy and precision.

The primary object of the present invention is to provide apparatus and a method for determining a number of dimensional characteristics of a jacket for a floppy disk wherein said characteristics can be used to determine the acceptability of the jacket for use in containing a floppy disk, whereby such determination can be used to verify jacket-making equipment with a high degree of accuracy and precision.

Further objects of this invention will become apparent as the following specification progresses, reference being had to the accompanying drawings for an illustration of the invention.

IN THE DRAWINGS

FIG. 4 is a view similar to FIGS. 2 and 3 but showing an instrument for measuring the distance from the center line of the jacket to a primary fold line thereof;

FIG. 4a is a view similar to FIG. 4 but showing an instrument for measuring the distance between a head cutout slot to the center fold line of the jacket;

FIG. 5 is a view similar to FIGS. 2-4 but showing an instrument for measuring the width of the write-enable notch near a primary fold of the jacket;

FIG. 6 is a view similar to FIGS. 2-5 but showing an instrument for measuring the final fold size and squareness of the jacket;

Figure 1:
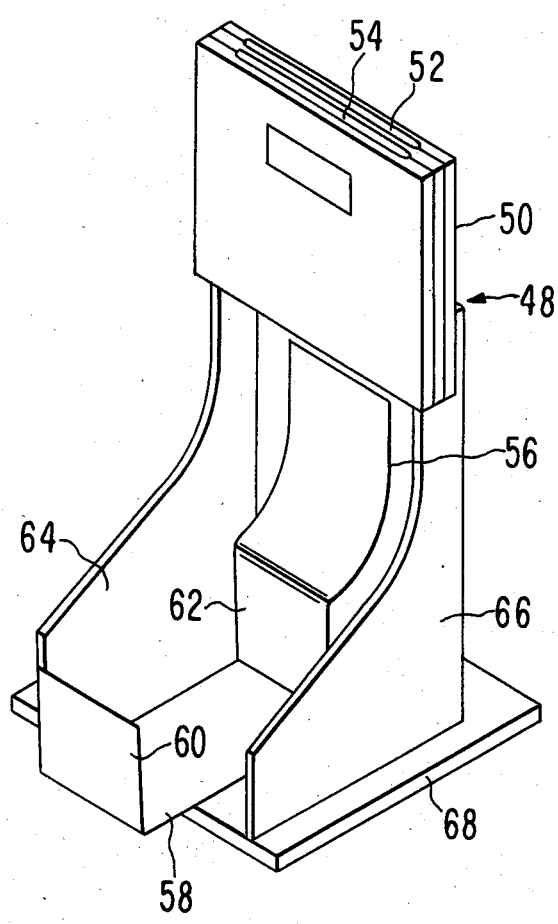
FIG. 1 is a perspective view of a drop-through instrument forming one component of the present invention and adapted for measuring the thickness of a floppy disk jacket.

The present invention is directed to a combination of instruments as shown in FIGS. 1 and 2-8 for verification of certain design dimensions of the jacket of a floppy disk after the jacket has been folded to present at least a pair of primary folds and later folded to present a final fold. The completed jacket to be measured or verified using the instruments of the present invention is broadly denoted by the numeral 10 and is shown in its completed form in FIG. 1A.

Jacket 10 is formed from a single sheet or blank 12 (FIG. 8) comprised of a pair of panels 14 and 16 which are connected together along a first or central fold line 18, the material of the jacket being of flexible sheet material of conventional construction. Panels 14 and 16 have circular holes 20 and 22 and slots 24 and 26, respectively, which mate with each other and form a single hole and a single slot when the panels are folded along line 18 and are in face-to-face relationship to each other. Panel 14 has a pair of side flaps 28 and 30 which are provided with angled end edges and which are adapted to be folded along primary fold lines 32 and 34, respectively, after panel 16 has been folded into face-to-face relationship to panel 14.

Figure 9:
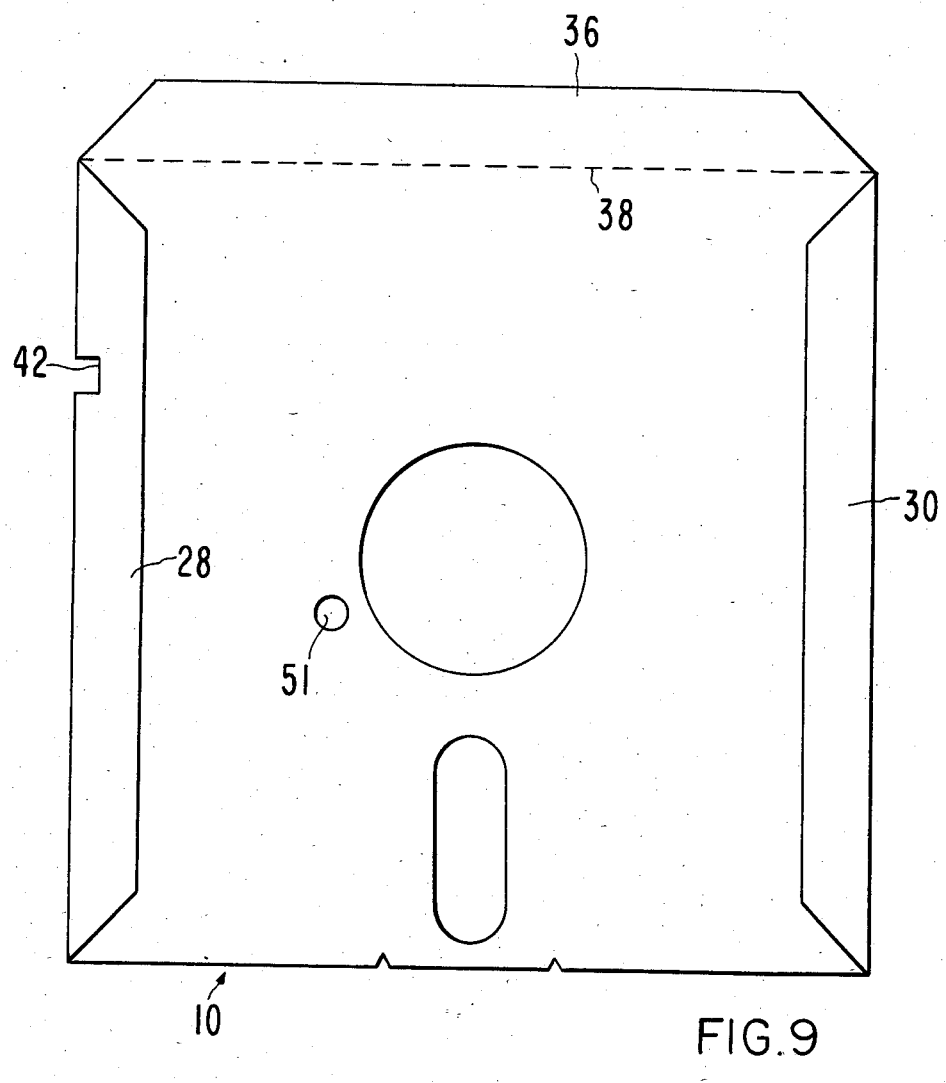
FIG. 9 is a side elevational view of the jacket, showing the primary folds but showing the jacket in a condition before the final fold.

Jacket 10 is shown in FIG. 9 with flaps 28 and 30 in abutting, face-to-face relationship to the outer surface of panel 16, thereby effectively coupling panels 14 and 16 into face-to-face relationship with each other. The attachment of the flaps 28 and 30 to panel 16 is accomplished by heat welding, adhesive or other means.

Figure 1A:
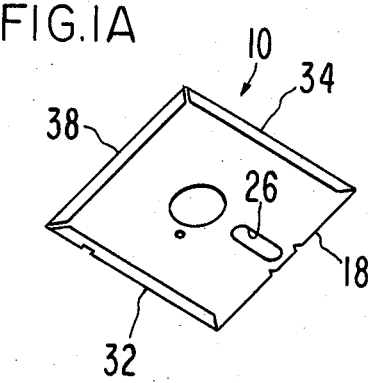
FIG. 1A is a perspective view of a floppy disk jacket whose various dimensions are to be measured with the present invention.

Panel 14 has a third flap 36 which is foldable along a final fold line 38 so that flap 36 overlies the adjacent margin of panel 16. FIG. 9 shows the jacket before the final fold of flap 36 along final fold line 38; however, FIG. 1A shows jacket 10 after the final fold of flap 36.

Panel 14 further has a rectangular notch 40 (FIG. 8) therein which straddles fold line 32, the notch being a write-enable slot 42 which is open at its outer end after flap 28 has been folded along primary fold line 32 as shown in FIG. 9. A crescent-shaped recess 44 is formed in the marginal edge 46 of panel 16 to accommodate slot 40 and slot 42. Without recess 44, the marginal edge of panel 16 would block notch 42.

Timing holes 48 and 50 are provided in panels 14 and 16. These holes mate with each other to form a single hole 51 (FIG. 9) when the jacket is completely folded as shown in FIG. 1A. The single hole mates with timing holes in the inner peripheral margin of the floppy disk inserted in the jacket.

A first instrument for measuring the thickness or warpage of jacket 10 is broadly denoted by the numeral 48 and includes a body 50 (FIG. 1) having a pair of slots 52 and 54 therethrough, the slots being of a size sufficient to accommodate the width of the jacket. The width of the slots is chosen to be no greater than a certain dimension. For instance, slot 52 can be made for a primary fold width of 0.085 inch, 0.090 inch or 0.095 inch. Slot 54 is used for the jacket after the final fold has been made and it typically has a width of 0.102 inch, for example. Slot 52 could have a range of widths, such as 0.085 to 0.095 inch while slot 54 could have a dimension range of 0.090 to 0.102 inch. Any warpage of a jacket placed in either slot will cause the jacket to hang up or jam in the slot and the jacket will not pass through the body 50.

If the jacket passes through the selected slot, it will strike a plate 56 which causes it to fall into a bin defined by a base plate 58 with sides 60 and 62. Side walls 64 and 66 support body 50 on a base 68.

Figure 2:
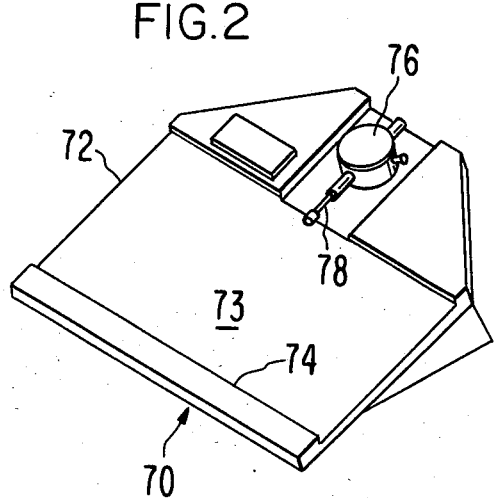
FIG. 2 is a perspective of a second instrument of the present invention suitable for use in measuring a primary fold of a jacket.
Figure 3:
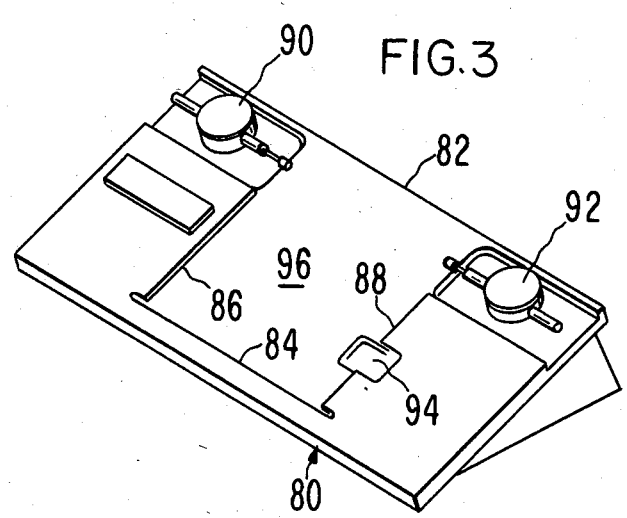
FIG. 3 is a view similar to FIG. 2 but showing an instrument for use in measuring the squareness of a primary fold of the jacket.

FIG. 2 shows an instrument 70 having a main body 72 provided with a flat surface 73 for supporting a jacket 10 and reference edge 74 adjacent to surface 73, edge 74 adapted to be engaged by jacket 10 near one of the two primary fold lines 32 and 34 of the jacket. The instrument 70 measures jacket side fold width and parallelism of the side edges of the jacket because the body 72 has a dial gauge 76 mounted thereon, the dial gauge having a shiftable leg 78 whose outer end bears against the jacket at one primary fold line, such as fold line 32, when the other primary fold line, such as fold line 34, engages reference edge 74. The instrument 70 is used by moving the jacket 10 so that it moves from left to right or right to left with one of the primary fold lines in engagement with the reference edge 74 of body 72. Any defect in the dimension if the primary fold lines are not in substantial parallelism of the fold line will be detected by gauge 76. A typical tolerance is ±0.010 inch when either primary fold line engages reference edge 74.

Another instrument of the present invention is broadly denoted by the numeral 80 (FIG. 3) and includes a body 82 having a first reference edge 84 and a pair of side reference edges 86 and 88 generally perpendicular to reference edge 84. A dial gauge 90 is associated with edge 86 and a dial gauge 92 is associated with edge 88. A recess 94 extends into body 82 below the level of the surface 96 on which jacket 10 is to be placed for measuring the squareness of the jacket. The recess 94 is to facilitate the manual pick-up of the jacket after the measurements have been made with gauges 90 and 92.

The squareness of a jacket 10 is measured by instrument 80 between the first fold line 18 and each of the primary fold lines 32 and 34. When instrument 80 is used, the jacket 10 is placed on flat surface 96 with first fold line 18 in engagement with reference edge 84 and primary fold line 32 in engagement with edge 86. Any departure from the squareness between these two fold lines of the jacket will be detected by gauge 90. A typical tolerance is ±0.015 inch. Similarly, the squareness between fold line 18 and fold line 34 is detected when the jacket is shifted slightly to the right to move primary fold line 34 into engagement with reference edge 88, whereupon gauge 92 will determine any departure from squareness between fold lines 18 and 34.

FIG. 4 shows an instrument 100 for measuring the distance from the center line of jacket 10 to each primary fold line 32 or 34. To this end, instrument 100 includes a body 102 having a flat surface 104 on which the jacket is mounted. A first reference edge 106 is adapted to be engaged by first or central fold line 18 while a second reference edge 108 is adapted to be engaged by a primary fold line 32 or 34. A gauge 110 has a leg 112 engageable by the primary fold line of the jacket when the fold line is adjacent to and engages reference edge 108. A projection 114 is rigidly secured to surface 104 and is adapted to be received in slot 26 when the jacket is in place on surface 104. Thus, any departure from a safe tolerance in the distance between the primary fold line and a reference edge 114a on projection 114 will be detected by gauge 110.

FIG. 4a shows an instrument 120 for measuring the distance between the central or first fold line 18 of the jacket and the adjacent extremity of the slot 26 when the jacket is in place on surface 123 of instrument 121. To this end, instrument 121 includes a body 125 of which flat surface 123 forms a part. A first reference edge 127 is adapted to be engaged by a primary fold line 32 or 34 while a second reference edge 129 is adapted to be engaged by central fold line 18 of the jacket. A gauge 131 has a leg 133 engageable by the central fold line 18 of the jacket when the fold line is adjacent and engages reference edge 129. A cylindrical projection 135 rigidly secured to surface 123 is adapted to be received in slot 26 when the jacket is in place on surface 123. Thus, any departure from a safe tolerance in the distance between central fold line 18 and the adjacent extremity of slot 26 will be detected by gauge 131.

FIG. 5 shows an instrument 120 having a body 122 provided with a flat surface 124 for supporting jacket 10. Instrument 120 measures the minimum width, depth and location of the write-enable notch 42 (FIG. 9) relative to the first fold line 18 of the jacket. The body 122 has a pair of dial gauges 126 and 128, the gauges having legs 130 and 132, respectively. Gauge 126 is near a side reference edge 127 adapted to be engaged by primary fold line 32 of a jacket 10 on surface 124. Leg 130 has an outer end which is adapted to enter write-enable slot 42 to measure the minimum width and depth of the slot. Any departure from a safe tolerance, such as 0.010 inch, will be detected by gauge 126. Any departure from a safe distance or location of the notch 42 relative to lower edge or fold line 18 will be detected by gauge 128.

Another instrument of the present invention is broadly denoted by the numeral 140 and is adapted for use in verifying the final fold line 36, and the overall size and squareness on all four sides of the jacket to insure optimum accuracy and efficiency. To this end, instrument 140 includes a body 142 having a flat surface 144 for supporting jacket 10. A pair of reference edges 146 and 148 are provided for body 142, the edges being generally perpendicular to each other. Gauges 150 and 152 have legs 154 and 156 for engaging a primary fold line while the legs 158 and 160 of gauges 162 and 164, respectively, are adapted to engage the final fold line 38 of the jacket. Thus, the squareness of the jacket can be determined for the one primary fold line, then the jacket can be inverted and the same test can be conducted for squareness for the other primary fold line. A typical tolerance is ±0.010 inch.

Figure 7:
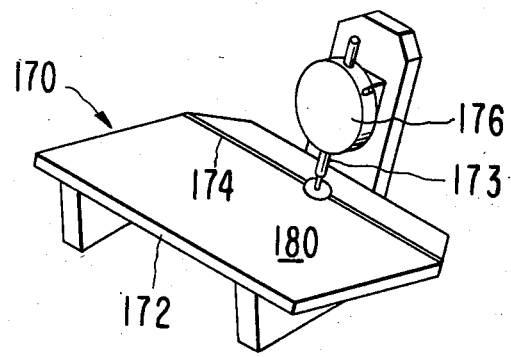
FIG. 7 is a view similar to FIGS. 2-6 but showing an instrument for measuring the thickness of the primary fold of a jacket.
Figure 8:
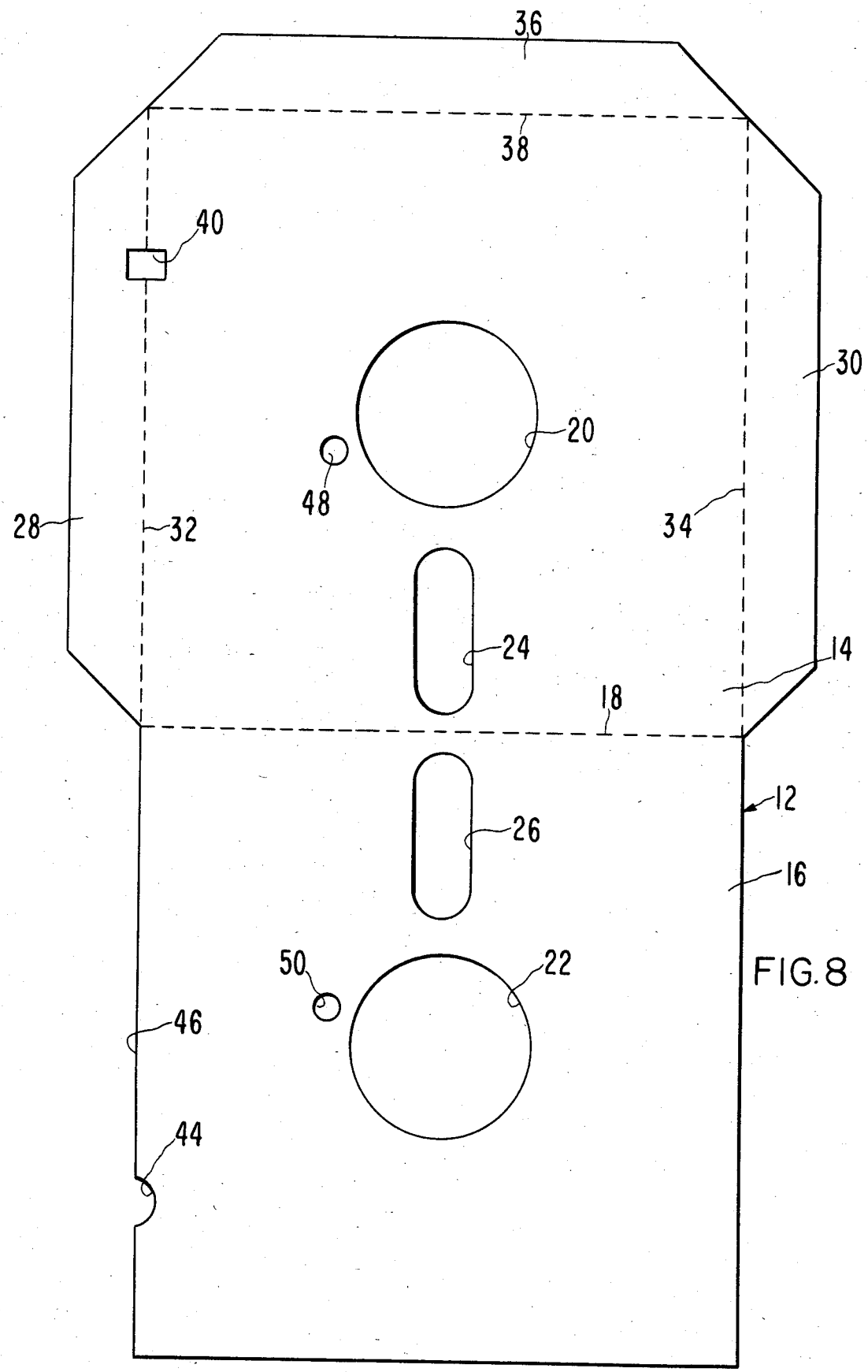
FIG. 8 is a plan view of the blank or sheet from which the jacket is made.

FIG. 7 shows an instrument 170 for measuring the thickness of the jacket at the primary fold and the final fold areas of the jacket. To this end, instrument 170 includes a body 172 having a reference edge 174 against which a primary fold line 32 or 34 is placed. A gauge 176 having a leg 178 engages the jacket at the fold line near the fold line of the jacket which engages edge 174. The thickness can then be determined as the jacket moves along the flat surface 180 of body 174 with the primary or final fold line in engagement with surface 174.

The instruments of the present invention are human engineered for simple, fast and accurate verification of fabrication machinery for making jacket 10. The simplicity of the instruments of the present invention allows a maintenance technician to identify and locate a problem in the production of jackets rapidly. Secondly, because of the fast and accurate sampling, optimum productivity is achieved. The instruments can all be located adjacent to each other at a measurement station so that a jacket can be quickly and easily measured by a person without requiring the person to move from one station to another.

While mechanical dial gauges have been used to provide the measurements, other types of measuring devices can be used which are electronic, of photo-optical construction, of laser construction and the like.

In carrying out the method of the present invention, a completed jacket 10 is used with instrument 48 to measure the warpage of the jacket. The slot 52 or 54 is first selected, then the jacket is dropped into the selected slot. For instance, slot 52 could have a width range such as 0.085 to 0.095 inch, while slot 54 could have a dimension range of 0.090 to 0.102 inch. If the jacket jams or hangs up on the slot, then the jacket is sufficiently warped to be unuseable, and the jacket is discarded. If the jacket passes through the slot, the jacket will fall into bin 58 and be removed in due course from the bin.

Another step of the method of the present invention includes placing the jacket on instrument 70 (FIG. 2) and moving the jacket in a manner such that one of its two primary fold lines 32 and 34 engages reference edge 74 as the other primary fold line move past and engages the outer end of the shiftable leg of dial gauge 76 of instrument 70. This step measures the parallelism between the primary fold lines. If any defect in this parallelism is detected by the dial gauge, the jacket is discarded.

Another step in the method of the present invention is to determine the squareness of a jacket 10. The squareness is measured between the first fold line 18 and each of the primary fold lines 32 and 34. With first fold line 18 in engagement with reference edge 84 of instrument 80, one of the two primary folded lines 32 and 34 is in engagement with edge 86 perpendicular to edge 84 of instrument 80. After the reading from dial gauge 90 is taken, the jacket is inverted, and the other primary fold line is brought into engagement with reference edge 86 as first fold line 18 remains in engagement with edge 84. Any departure from a specified tolerance in the squareness of the jacket will be the basis for discarding the jacket.

Another step in the method of the present invention is to determine the distance between each primary fold line at the center line of the jacket. To this end, fold line 18 is placed in engagement with reference edge 106, while a primary fold line is placed in engagement with edge 108. With one side edge of central slot 26 of the jacket engaging reference edge 114A (FIG. 4) of projection 114 extending into jacket slot 26, the reading of dial gauge 110 is taken. If the tolerance measured by the reading is less than a certain value, the jacket is acceptable; otherwise, the jacket must be discarded. After the first reading is taken with one primary fold line engaging edge 108, the jacket is inverted, and the other primary fold line is brought into engagement with edge 108, following which a reading is taken to determine if the jacket falls within the predetermine tolerance value.

Another step of the method of the present invention is to measure the minimum width, depth and location of the notch 42 of the jacket 10 relative to the first fold line 18 of the jacket. To this end, fold line 18 is brought into engagement with the outer end of leg 132 of dial gauge 128 of instrument 120 (FIG. 5). Then, the fold line 32 is brought into engagement with reference edge 127 with the outer end of leg 130 of dial gauge 126 in notch 42. If readings of gauges 126 and 128 fall within acceptable tolerance ranges, then the jacket is acceptable; otherwise, the jacket is discarded.

Another step in the method of the present invention is to verify the final fold line 36 and the overall size and squareness of all four sides of the jacket. This is achieved by placing the jacket such that one of the primary fold lines engages edge 148 of instrument 140 (FIG. 6) while first fold line 18 engages reference edge 146, and as the outer ends of legs 158 and 160 of dial gauges 162 and 164 engage the final fold line 38. When dial readings have been taken with one of the primary fold lines engaging reference edge 148, the jacket is inverted and the other primary fold line is moved into engagement with reference edge 148. If the dial readings for both gauges are within specified tolerance ranges, the jacket is acceptable; otherwise, the jacket must be discarded.

Another step in the method of the present invention is to measure the thickness of the jacket at the regions of the primary fold lines 32 and 34 and the region of the final fold line 38 of the jacket. To this end, the three fold lines are successively brought into engagement with reference edge 174 of instrument 170, and readings from dial gauges 176 are successively taken. If the readings are within specified tolerance ranges, the jacket is acceptable; otherwise, the jacket must be discarded.

The various steps of the method of the present invention can be performed in substantially any order. The order mentioned above is not limiting, and the steps could be performed in an order different from that described above.

I claim:

1. Apparatus for determining the dimensional characteristic of a jacket for a floppy disk in which the jacket has a first fold line, a pair of primary fold lines extending from respective ends of the first fold line, a final fold line on the margin of the jacket opposite to the first fold line, a head cutout slot, and a write-enable notch in one of the primary fold lines comprising:

first means including a generally vertical slot for receiving and passing a jacket along a generally vertical path to determine the warpage of the jacket;

second means adjacent to the first means for determining the parallelism between the primary fold lines of the jacket;

third means adjacent to the first and second means for determining the squareness between the first first fold line and each of the primary fold lines of the jacket;

fourth means adjacent to the first, second and third means for determining the distance from the center line of the jacket to each of the primary fold lines thereof;

fifth means adajcent to the first, second, third and fourth means for determining the distance from the first fold line to the adjacent extremity of the head cutout slot;

sixth means adjacent to the first, second, third, fourth and fifth means for determining the width and depth of the write-enable notch of the jacket and for measuring the distance from the notch to the first fold line of the jacket;

seventh means adjacent to the first, second, third, fourth, fifth and sixth means for determining the squareness of the primary and final fold lines of the jacket relative to the first fold line thereof; and eighth means adjacent to the first, second, third, fourth, fifth, sixth and seventh means for determining the thickness of the jacket at the regions of the primary fold lines and the final fold line of the jacket.

2. Apparatus as set forth in claim 1 wherein said first means include a body having said slot therein, means mounting the body above a bin, and means for directing a jacket falling through the slot into the bin.

3. Apparatus as set forth in claim 1, wherein said second means includes a body having a flat surface for supporting a jacket, there being a reference edge adjacent to one margin of said surface, there being a measuring device for detecting the presence of a fold line of the jacket opposite to the fold line in engagement with the reference edge.

4. Apparatus as set forth in claim 1, wherein said third means comprises a body having a flat jacket-supporting surface, a first reference edge for engaging the first fold line of the jacket and a pair of second reference edges generally perpendicular to the first reference edge for engaging respective primary fold lines of the jacket, there being a measuring device for each second reference edge, respectively.

5. Apparatus as set forth in claim 1, wherein said fourth means includes a body having a flat jacket-supporting surface, a first reference edge for engaging the first fold line of a jacket, a projection on the flat surface for entrance into the head cutout slot of the jacket, said projection having a reference edge thereon for engaging the side of the slot of the jacket, and a measuring device at one side of said flat surface for engaging a primary fold line of the jacket to determine the distance from the primary fold line to the center line of the jacket.

6. Apparatus as set forth in claim 1, wherein said fifth means includes a body having a jacket-supporting surface, a first reference edge for engaging the central fold line of a jacket, a projection on the flat surface adjacent to the first reference edge for entrance into the head cutout slot of the jacket, and a measuring device at one side of said flat surface for engaging the central fold line of the jacket to determine the distance from the central fold line to the adjacent extremity of the slot.

7. Apparatus as set forth in claim 1, wherein said fifth means includes a body having a flat jacket-supporting surface and a reference edge at one side of the surface, there being a measuring device having a shiftable member for entering the write-enable slot of the jacket, and a second measuring device for engaging the first fold line of the jacket to determine the distance between the notch and the first fold line.

8. Apparatus as set forth in claim 1, wherein said sixth means includes a body having a flat jacket-supporting surface provided with a first reference edge for engaging the first fold line of a jacket on the surface, a second reference edge generally perpendicular to the first reference edge, a third reference edge parallel to and spaced laterally from the first reference edge, a pair of measuring devices having shiftable jacket-engaging legs adjacent to the second reference edge, and a second pair of measuring devices each having a shiftable jacket-engageable leg adjacent to the third reference edge, said measuring devices being operable to determine the squareness of the primary and final fold lines of the jacket relative to the first fold line thereof when the jacket is on the flat supporting surface of the body.

9. Apparatus as set forth in claim 1, wherein said seventh means includes a body having a flat jacket-supporting surface, a first reference edge for engaging a primary fold line or the final fold line of a jacket on the surface, and a measuring device above the surface and the reference edge, said measuring device having a shiftable leg for engaging the jacket in the regions of the primary fold line and the final fold line when the jacket is on the surface.

10. A method of determining the dimensional characteristics of a jacket for a floppy disk in which the jacket has a first fold line, a pair of primary fold lines extending from respective ends of the first fold line, a final fold line on the margin of the jacket opposite to the first fold line, and a write-enable notch in one of the primary fold lines comprising:

determining the warpage of the jacket;

determining the parallelism between the primary fold lines of the jacket;

determining the squareness between the first fold line and each of the primary fold lines of the jacket;

determining the distance from the center line of the jacket to each of the primary fold lines thereof;

determining the width and depth of the write-enable notch of the jacket and measuring the distance from the notch to the first fold line of the jacket;

determining the squareness of the primary and final fold lines of the jacket relative to the first fold line thereof; and determining the thickness of the jacket at each of the regions of the primary fold lines and the final fold lines of the jacket.

11. A method as set forth in claim 10, wherein the step of determining the warpage of the jacket includes directing the jacket into a generally vertical slot and moving the jacket into a bin if the jacket passes through the slot without stopping.

12. A method as set forth in claim 10, wherein said step of determining the parallelism between the primary fold lines of the jacket include moving one of the fold lines along a reference line as variations in the distance between the primary fold lines are detected.

13. A method as set forth in claim 10, wherein the step of determining the squareness between the first fold line and each of the primary fold lines includes placing the first fold line adjacent to and along the first reference line, moving a primary fold line into a position adjacent to and along a second reference line, and detecting the presence of any angularity between the first and primary fold lines which extend along the first and second reference lines.

14. A method as set forth in claim 10, wherein the step of determining the distance from the center line of the jacket to each of the primary fold lines includes placing the first fold line against and along a first reference line, placing one side edge of a central slot of the jacket against a second reference line, and measuring the distance from the second reference line to a primary reference line spaced laterally therefrom.

15. A method as set forth in claim 10, wherein the step of determining the distance from the first fold line of the jacket to the adjacent extremity of the head cutout slot includes placing the first fold line against and along a first reference line, inserting a projection into the head cutout slot, and measuring the distance from the first fold line to the adjacent extremity of the projection.

16. A method as set forth in claim 10, wherein the step of determining the width and depth of the write-enable slot includes placing said one primary fold line against a first reference edge, measuring the width and depth of the notch when the one primary fold line is in engagement with the reference edge, and measuring the distance from the notch to the first fold line when the width and depth of the notch are being measured.

17. A method as set forth in claim 10, wherein the step of determining the squareness of the primary and final fold lines of the jacket include placing the first fold line along a first reference line, placing a primary fold line along a second reference line, placing the final fold line along a third reference line, and measuring the location of the primary fold line and final fold line with reference to the first fold line when the first fold line extends along said first reference line.

18. A method as set forth in claim 10, wherein the step of determining the thickness of the jacket includes successively measuring the height of the regions of the primary fold lines and the final fold lines of the jacket when the jacket is supported on a surface.

* * * * *